May 29, 1928.
C. L'ENFANT
CARD CASE
Filed Sept. 10, 1926    5 Sheets-Sheet 1
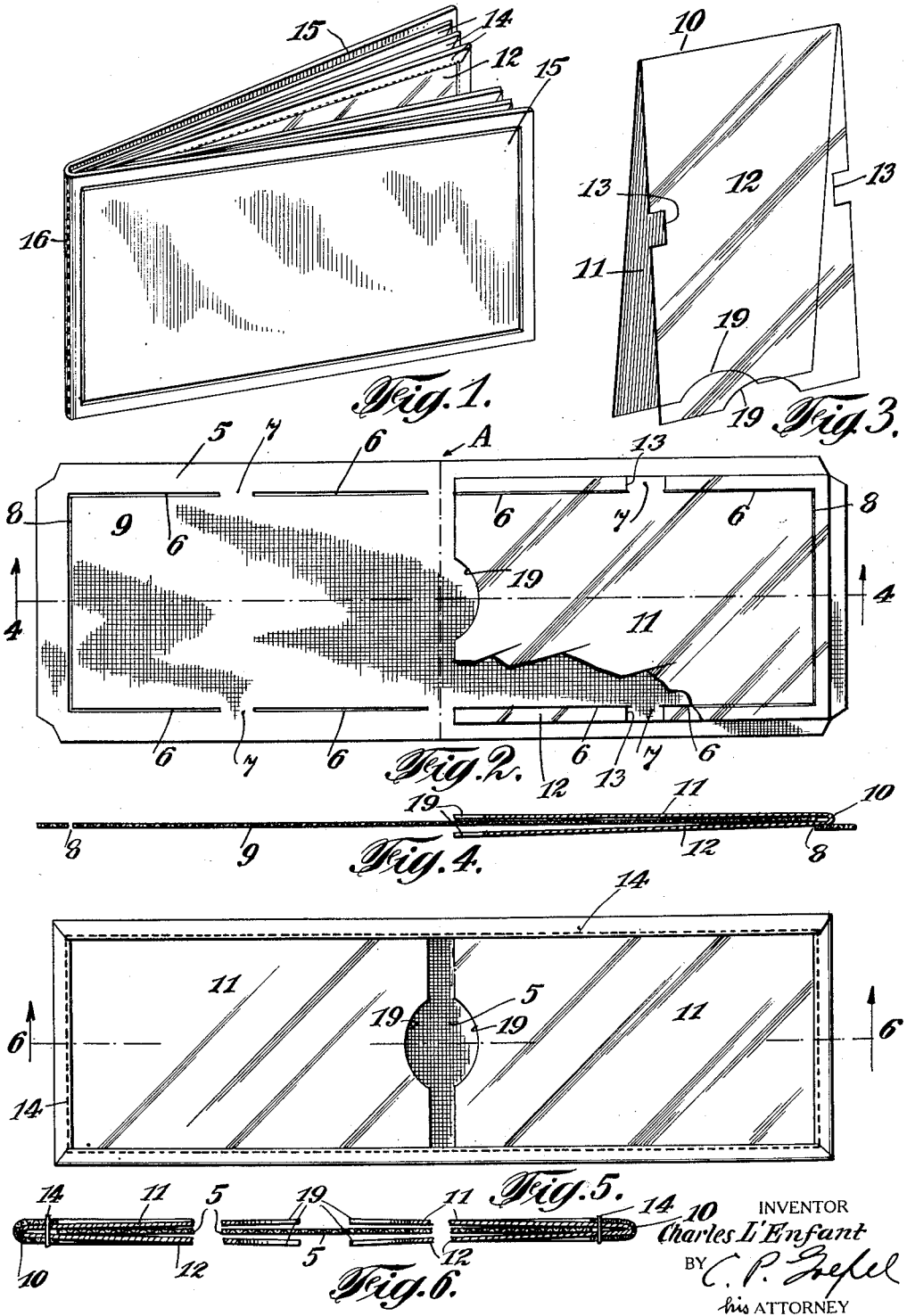
INVENTOR
Charles L'Enfant
BY
his ATTORNEY May 29, 1928. 1,671,298
C. L'ENFANT
CARD CASE
Filed Sept. 10, 1926 5 Sheets-Sheet 2

INVENTOR
Charles L' Enfant
BY
his ATTORNEY

May 29, 1928. 1,671,298
C. L'ENFANT
CARD CASE
Filed Sept. 10, 1926 5 Sheets-Sheet 3

INVENTOR
Charles L'Enfant
BY
his ATTORNEY

May 29, 1928.  1,671,298

C. L'ENFANT

CARD CASE

Filed Sept. 10, 1926  5 Sheets-Sheet 4

INVENTOR
Charles L'Enfant
BY
his ATTORNEY

May 29, 1928.

C. L'ENFANT 1,671,298

CARD CASE

Filed Sept. 10, 1926  5 Sheets-Sheet 5

INVENTOR
Charles L'Enfant
BY
his ATTORNEY

Patented May 29, 1928.

1,671,298

UNITED STATES PATENT OFFICE.

CHARLES L'ENFANT, OF NEW YORK, N. Y.

CARDCASE.

Application filed September 10, 1926. Serial No. 134,599.

This invention relates to card cases of that type which are adapted to contain identification or lodge cards, licenses and other papers for convenient display and to protect the same against dust and dirt and mutilation due to frequent handling thereof.

More particularly, the subject matter of the present application relates to certain important improvements in the disclosure contained in a co-pending application filed by me on August 11, 1926, Serial No. 128,605.

It is the primary object of my present improvements to provide a card case construction including a flexible body sheet and a transparent window sheet and means for accurately assembling and securing said sheets together to provide a card receiving pocket without necessitating the use of liquid cement, glue or other adhesive.

More particularly, I propose to provide this transparent window sheet and the flexible body sheet with means adapted for coacting interlocking engagement in the initial assemblage of said sheets whereby the window sheet is properly held against movement upon one side of the flexible body sheet and with side and end edges thereof spaced from the corresponding edges of the body sheet. It thus becomes possible to then turn or fold the projecting edges of the body sheet inwardly upon the window sheet and stitch the same together on an ordinary sewing machine. It will accordingly be evident that the quantity production of such card cases is greatly expedited in comparison with the methods of manufacture now generally used while at the same time a product of superior wearing qualities and of neater appearance is produced.

It is another important object of the invention in a preferred embodiment thereof to provide a structure in which the transparent windows on opposite sides of the plane of the flexible body sheet are produced from a single sheet of transparent material centrally folded on itself, and one of the folded parts of said sheet having the means for interlocking connection with the body sheet so located that said windows may be retained in properly assembled relation with the body sheet with said body sheet remaining intact between the windows to provide separate card receiving pockets, or with the body sheet between the windows cut out so as to provide a single pocket for the reception of a card printed on both sides and whereby the printed matter on each side of the card will be visible through said windows.

With the above and other objects in view, the invention consists in the improved card case, and in the form, construction and relative arrangement of its several parts as will be hereinafter more fully described, illustrated in the accompanying drawings, and subsequently incorporated in the subjoined claims.

In the drawings, wherein I have illustrated several simple and practical embodiments of the invention, and in which similar reference characters designate corresponding parts throughout the several views,—

Figure 1 is a perspective view of a multisection card case in accordance with one embodiment of the invention;

Fig. 2 is a plan view of one of the card case sections showing the blank form of the flexible body sheet which provides relatively movable card holding leaves, the integrally connected transparent windows being applied to one of the leaves and one of the windows partly broken away;

Fig. 3 is a detail perspective view of the two integrally connected transparent windows;

Fig. 4 is a longitudinal sectional view taken on the line 4—4 of Fig. 2;

Fig. 5 is a plan view showing one of the completed card case sections;

Fig. 6 is a longitudinal section on an enlarged scale taken on the line 6—6 of Fig. 5;

Figures 15, 16:
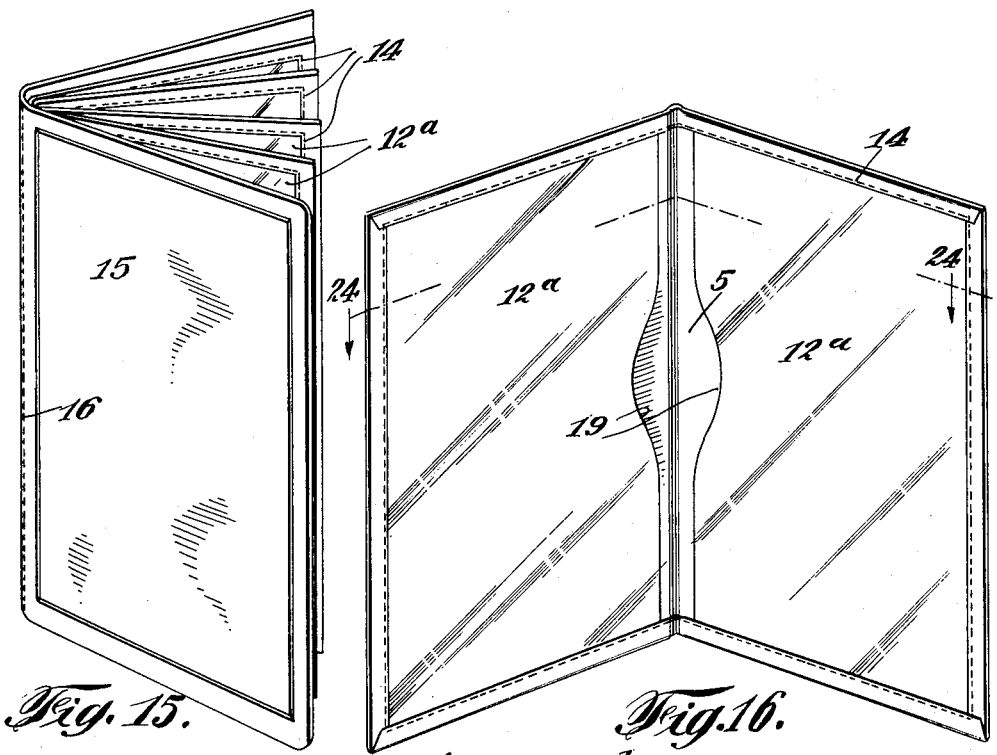
Fig. 15 is a perspective view of a multi-leaf card case slightly different in form from that shown in Fig. 1, produced in accordance with another alternative embodiment of the invention.
Fig. 16 is a detail perspective view of one of the leaf sections of the case.
Figures 20, 21:
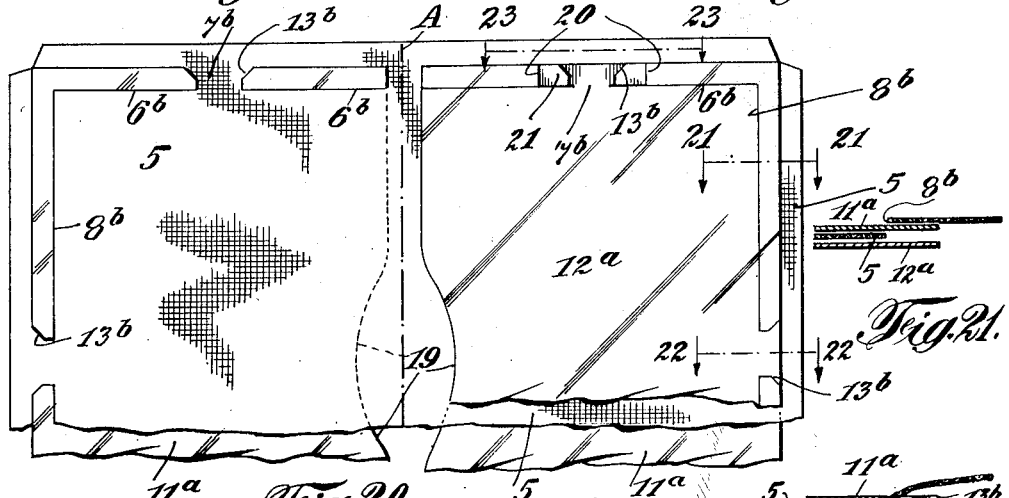
Fig. 20 is a fragmentary plan view showing the two transparent windows as initially assembled on opposite sides of one of the leaf forming portions of the body sheet and one transparent window assembled upon the other leaf forming portion of said sheet.
Figures 22, 23:
Figure 24:
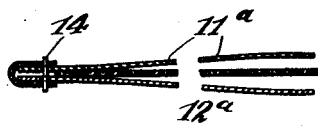

Figs. 21 and 22 are detail sectional views taken on the lines 21—21 and 22—22 respectively, of Fig. 20;

Fig. 23 is a detail section along the line indicated at 23—23 in Fig. 20, showing the interlocked edges of the two window sheets in elevation, and Fig. 24 is an enlarged horizontal sectional view taken on the line 24—24 of Fig. 16.

Referring in detail to the drawings, and for the present more particularly to Figs. 2 to 6 inclusive thereof, in the embodiment of my present improvements as therein illustrated, I provide an elongated sheet of flexible material 5 such as leather or fabric, imitation leather or paper. This flexible body sheet is of sufficient length so that when centrally folded on itself, two leaves of the desired size will be produced. This fold line I have indicated in Fig. 2 by the dotted line A. Each leaf of this flexible body sheet is cut or slit longitudinally as at 6 in spaced parallel relation to its opposite side edges, there being a pair of such longitudinal slits spaced from each edge of the body sheet and also spaced at their inner ends from each other so that a portion or web 7 of the material integrally connects the inner portion of the sheet with the outer marginal portion thereof. The flexible body sheet 5 is also cut or slit transversely as at 8 in spaced parallel relation to the end edge of the leaf, said slit connecting the outer ends of corresponding slits 6, and thus providing an inner portion 9 of the leaf which is entirely separate from the outer marginal portion thereof along three sides and can be readily flexed out of the plane of said marginal portion.

Each leaf formed by the flexible body sheet 6 is adapted to be provided with transparent windows positioned on opposite sides of the plane of said body sheet. For convenience in manufacture and expedition in the assemblage of the parts, I prefer to make these two transparent windows from one continuous piece of celluloid or other suitable transparent material. This piece of celluloid is cut to suitable length and width in accordance with the length and width of the leaves or sections of the body sheet 5 and is centrally folded upon itself as shown at 10 thus providing the two transparent window panes 11 and 12 of equal length integrally connected along said fold line 10. One of these window panes, as pane 12, is provided substantially midway of the length of each of its side edges with a rectangular notch 13.

In assembling the window panes upon the respective leaves of the flexible body wall 5, the window pane 12 having the notches 13 therein is slightly flexed or buckled transversely and the free end thereof is inserted through the slit 8 in the body wall from one side of said wall beneath the free portion of said wall bounded by the slits 6 and 8, said portion of the body wall and its marginal portion contiguous thereto being thereby relatively displaced out of a common plane. The integrally connected transparent panes 11 and 12 are then moved longitudinally in an inward direction relative to the body wall 5 until the notches 13 register with the webs 7 of the body wall between the ends of the slits 6. Upon releasing the inward pressure against the longitudinal edges of the window pane 12, said edge portions thereof may be readily engaged through the slits 6, the webs 7 of the body wall being received in said notches 13. Thus, the edge portions of the two transparent panes 11 and 12 outwardly of the slits 6 will be positioned upon the same side of the marginal portion of the body wall 5 while the inner portion of said wall between the opposite slits 6 is disposed between the two transparent panes 11 and 12 and constitutes a common opaque pocket wall while the panes 11 and 12 provide transparent outer pocket walls on each side of the body sheet 5. By reason of the interlocking connection between the integrally joined transparent window panes afforded by the notches 13 and webs 7 of the body wall, said transparent panes are held in proper position against longitudinal or transverse shifting movement relative to said body wall. When the transparent windows have thus been applied to each leaf of the body wall 5 as shown at the right hand side of Fig. 2 of the drawings, the longitudinal and end edge portions are run beneath the presser foot of a sewing machine provided with a suitable attachment for turning the marginal edges of the body wall 5 inwardly upon the side and outer end edges of the window pane 11 and stitching said folded or inwardly turned edges of the body wall and the edges of the window panes 11 and 12 together as shown at 14 in Fig. 4 of the drawings. In this manner, there is provided card receiving pockets on each side of the two leaves formed by folding the body wall along the line A between the inner ends of said pockets. An identification card, lodge card, license or other paper or memorandum sheet may be easily inserted in each of these pockets and the printed matter thereon can be clearly seen through the transparent window panes 11 and 12.

A number of card case sections of the above description may be nested together in the manner shown in Fig. 1 of the drawings, and enclosed within a suitable cover 15 consisting of integrally connected front and back portions, said nested sections being permanently bound between the cover portions along the folds A of said sections by a suitable fastening or securing means such as the stitching indicated at 16.

Heretofore, in order to properly hold the transparent window panes upon the flexible body sheet 5 so that the marginal edges of said sheet could be turned over and stitched to the edges of the window panes, it has been customary to use a suitable cement, glue or other adhesive. This operation is tedious and time-consuming and it is impossible to prevent smearing the surface of the transparent window sheet with the liquid adhesive, the removal of which also is a material item in the labor cost involved in the manufacture of such articles. It will therefore, be apparent that by means of my invention whereby the transparent window sheets may be easily and quickly interlocked with the flexible body sheet without the use of such glue or other adhesive, labor and material cost will be appreciably reduced and the quantity production of such card cases at greatly reduced cost is rendered possible.

In Figs. 7 to 11 of the drawings, I have shown a slightly modified construction particularly intended for the purpose of providing each leaf of the card case with a single pocket, each side wall of which consists of a transparent window for the purpose of receiving a single card printed upon both sides. To this end, the flexible body sheet 5 has the inner portion of each leaf cut out providing the rectangular opening 17. The intermediate portion of the body sheet between the two openings 17 and in line with the side edges thereof is provided with longitudinally spaced slits 18.

Figure 10:
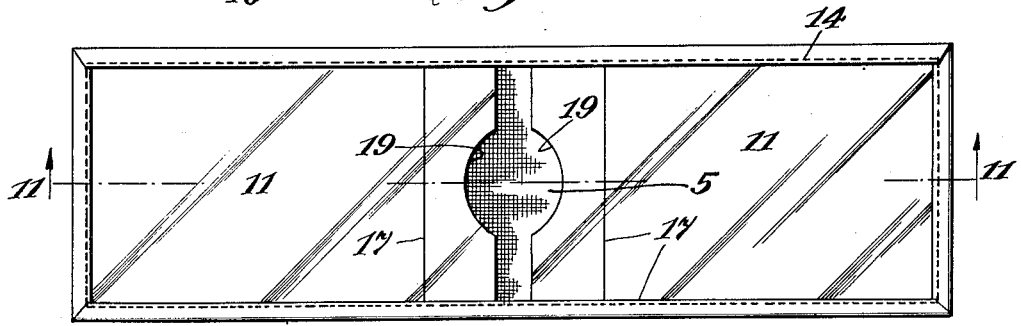
Fig. 10 is a plan view similar to Fig. 4 of said modified construction.
Figure 11:
Fig. 11 is an enlarged longitudinal section taken on the line 11—11 of Fig. 10.
Figure 8:
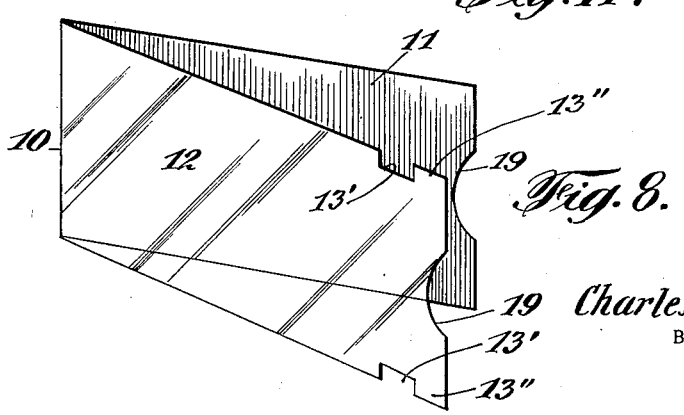
Fig. 8 is a detail perspective view of the integrally connected windows shown in Fig. 7.

In this modified construction, instead of providing central notches in the edges of the transparent window pane 12 as in the construction above described, these notches are located adjacent to the free end edge of the window pane as shown at 13'. In assembling the parts, the two window panes 11 and 12 are arranged upon one side of the body sheet 5 and the free end of the pane 12 is inserted through the opening 17 at the inner edge thereof and positioned on the opposite side of the intermediate portion of the body sheet, it of course being understood that since the window pane is of greater width than said opening, it must first be transversely buckled or flexed as heretofore stated. Upon the release of said window pane, the end portions 13'' thereof at one side of the notches 13' are engaged through the slits 18 and the portions of the body sheet between these slits and the inner end edge of the opening 17 is received in said notches. Thus, the two window panes are held in interlocked connection with said body sheet while the marginal edges thereof are turned inwardly and stitched to the corresponding edges of the window panes, thus completing the article as seen in Fig. 10 of the drawings. In this case, the length of the opening 17 is slightly less than the length of the card which the case is designed to receive so that the end of the card will extend over upon the intermediate part of the flexible body sheet, thus enabling it to be easily removed. Also for this purpose, in each form of my invention, the inner ends of the window panes 11 and 12 are provided with suitably formed finger receiving notches 19.

Figure 12:
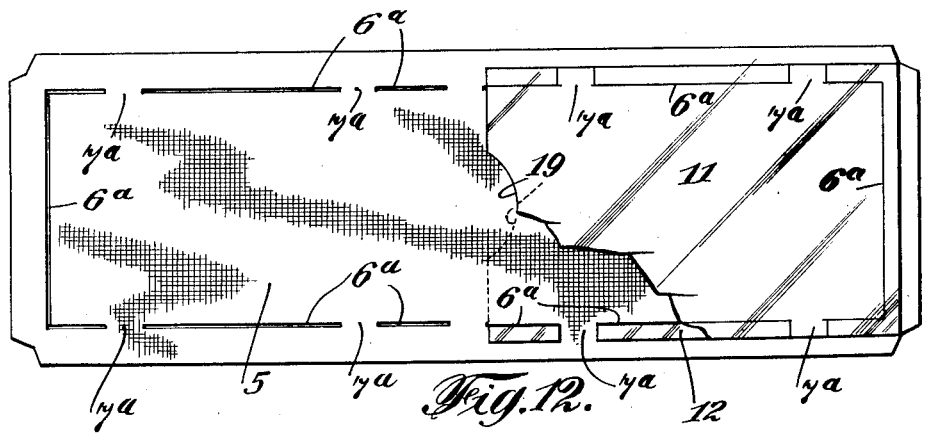
Fig. 12 is a view similar to Fig. 7 showing another modified form of the device.
Figure 13:
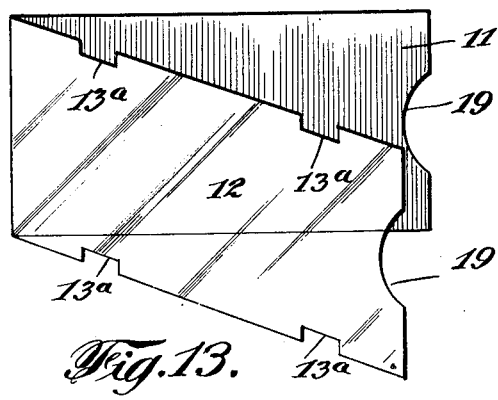
Fig. 13 is a perspective view of the integrally connected windows shown in Fig. 12.

In Figs. 12 and 13 I show another construction, in which the transparent window pane 12 is provided in each of its longitudinal edges with two notches 13$^a$ longitudinally spaced from each other and preferably located adjacent to the opposite ends of the window pane. Of course in such construction, the body sheet 5 will be provided with the longitudinal slits 6$^a$ properly spaced from each other to provide the web portions 7$^a$ of said body sheet at the requisite points to be received in the spaced notches 13$^a$. By thus interlocking the edge of the window pane at longitudinally spaced points with the flexible body sheet, there is less liability of the body sheet rumpling or buckling in the stitching operation.

Figure 7:
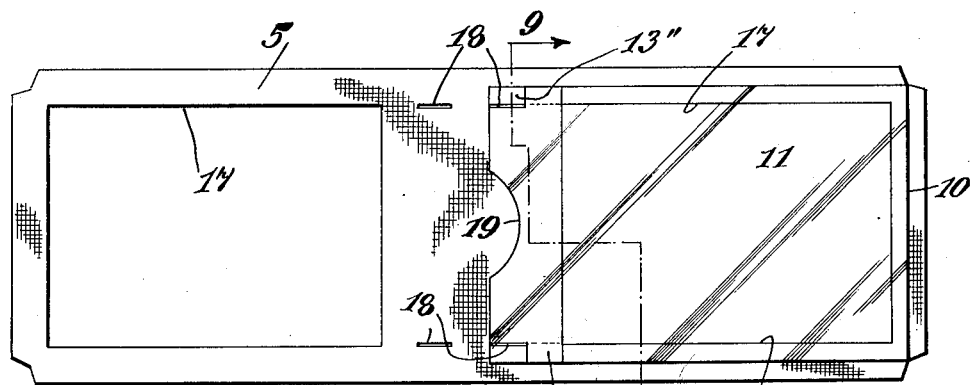
Fig. 7 is a view similar to Fig. 2 showing a slightly modified construction.
Figure 9:
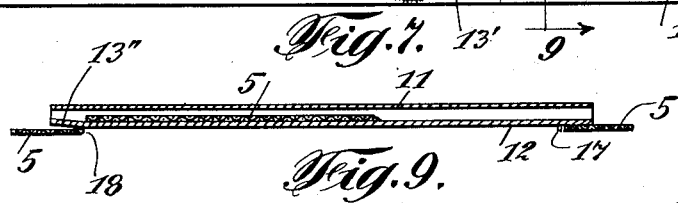
Fig. 9 is a transverse sectional view taken on the line 9—9 of Fig. 7.
Figure 14:
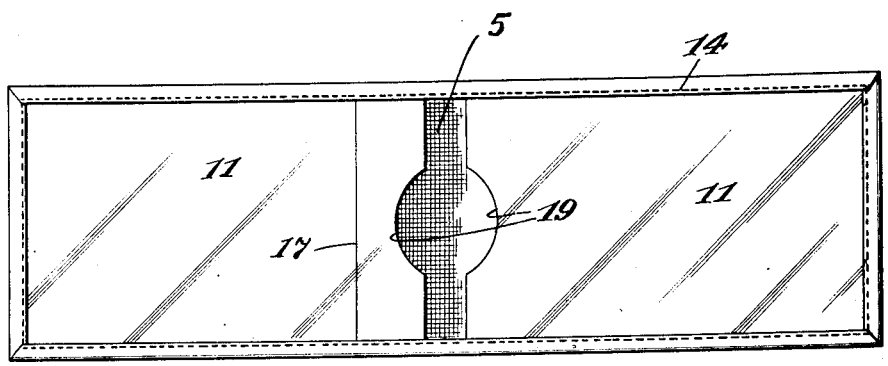
Fig. 14 is a plan view of a completed case section showing one half or leaf thereof with the body wall disposed between the windows to provide separate card pockets while in the other leaf said central body wall is cut away or omitted so that both sides of a single card arranged between the windows may be seen.

In Fig. 14 of the drawings, I have shown one leaf of the card case section provided with the opaque body wall between the transparent panes of the opposite side pockets as in Figs. 2 and 12, while the other leaf of the card case section may be provided with the single pocket having the transparent walls or windows on each side thereof as in Fig. 7.

It is of course, not essential that the card receiving pockets shall be of the form shown in the constructions above referred to and the case sections stitched together within the cover or binder along one of their short end edges. Thus, as indicated in Figs. 15 and 16 of the drawings the card receiving pockets might be open along one of their longer side edges and in such case secured in nested relation within the cover or binder as indicated in Fig. 15.

Figure 17:
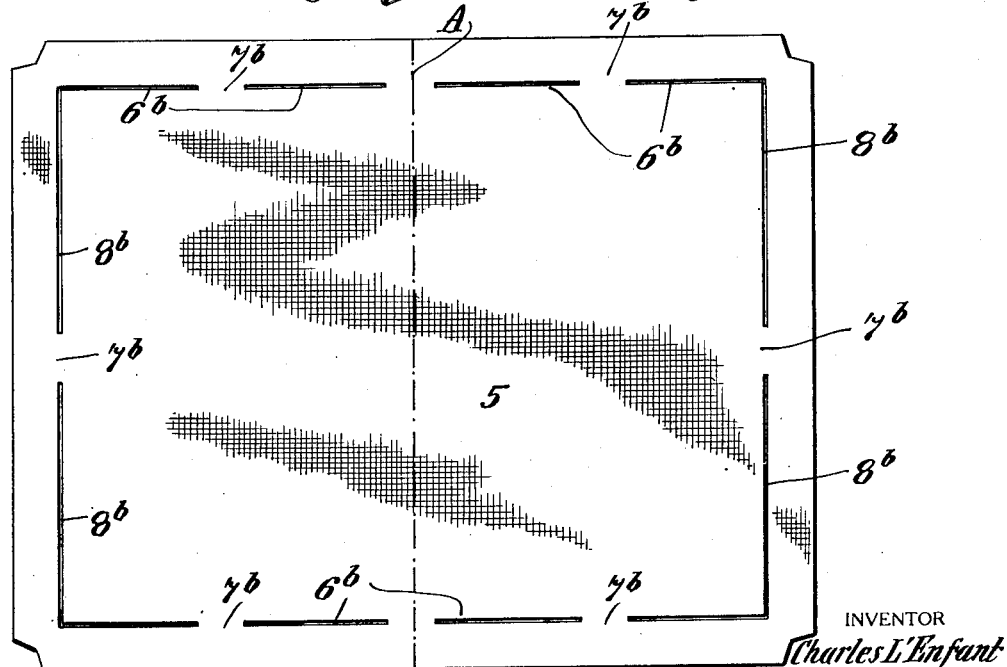
Fig. 17 is a plan view of the blank body sheet as used in this alternative construction.
Figure 18:
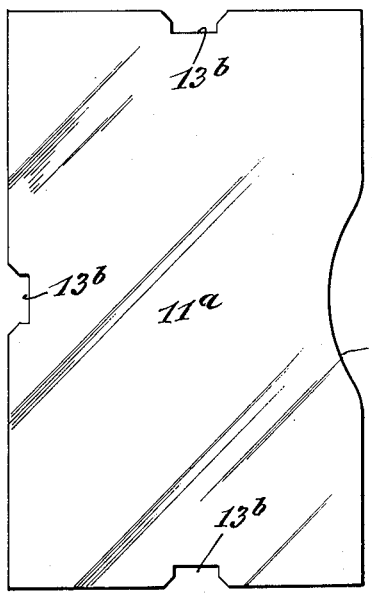
Figs. 18 and 19 are detail plan views of two separate window sheets showing the means for interlocking said window sheets with the flexible body sheet.
Figure 19:
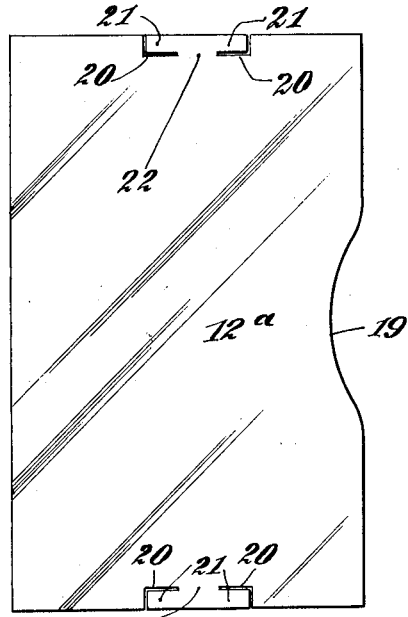

In Figs. 17 to 24 inclusive of the drawings, I have disclosed still another alternative embodiment of my present improvements, wherein the window panes 11ª and 12ª respectively, are not in the form of an integrally connected sheet of transparent material but are structurally independent of each other. Therefore, in this case, each of these transparent window sheets is provided with means whereby it may be interlocked with the flexible body wall of the card case section. In Fig. 17, I have shown the blank form of this body wall properly prepared for the connection of the transparent sheets thereto on opposite sides of the plane of said wall. To this end, the flexible body wall is provided in spaced relation to its opposite longitudinal edges with the spaced aligned slits 6ᵇ and in similarly spaced relation to its end edges with a pair of spaced aligned slits 8ᵇ, said latter slits at one of their ends connecting with one of the slits 6ᵇ at the corners of the body sheet. There is thus provided between these spaced slits portions 7ᵇ of the body sheet for interlocking connection with the transparent window sheets. As shown in Fig. 18 of the drawings, the window sheet 11ª is provided in its opposite end edges and in one of its longitudinal edges substantially at the center thereof with notches 13ᵇ which are preferably flared or widened outwardly to the edge of the sheet. The other transparent window sheet 12ª at corresponding points in its end edges is provided with spaced L-shaped slits 20 therein in opposed relation, thus affording oppositely extending fingers 21 normally disposed in the plane of the window sheet and integrally connected to the body thereof as at 22. In assembling the transparent window sheets upon the flexible body sheet, the window sheets or panes 11ª are first arranged on one side of the flexible body sheet and the marginal end and one side edge thereof are engaged through the slits 6ᵇ and 8ᵇ, the parts 7ᵇ of the body sheet being received in the interlocking notches 13ᵇ. The other transparent window sheets or panes 12ª are then arranged upon the opposite side of the body sheet and the fingers 21 on the opposite ends thereof are engaged under the marginal edge portions of the window sheet 11ª at opposite sides of the notches 13ᵇ between said window sheet 11ª and the flexible body sheet 5. Thus, the two transparent window sheets may be easily and quickly arranged in position upon opposite sides of the body sheet 5 and with their corresponding edges in registering relation. While the window sheets are thus securely held against shifting movement relative to the body sheet, the marginal edge portions of the body sheet are turned over and stitched to the corresponding edges of the transparent window sheets by machine, as above explained. However, by reason of the great simplicity thereof, the constructions heretofore described wherein the two transparent window sheets are structurally integral with each other, is preferred.

From the foregoing description considered in connection with the accompanying drawings, the several described and illustrated embodiments of my present improvements will be clearly understood. In each case, it will be seen that the essential and novel feature resides in the provision of means whereby the transparent windows on opposite sides of the plane of the flexible body sheet may be readily interlocked with the latter and retained in proper position relative to the marginal edges of said body sheet, while the latter are being machine stitched to the transparent windows. While I have found the herein described constructions to be entirely practical and very desirable from the standpoint of quantity production and the reduced manufacturing cost of such articles, it is nevertheless to be understood that the fundamental feature as above explained might also be exemplified in various other alternative mechanical structures. Accordingly, I reserve the privilege of resorting to all such legitimate changes in the form, construction and relative arrangement of the several parts as may be fairly embodied within the spirit and scope of the invention as claimed.

I claim:

1. In a card case, a flexible body wall, a transparent window pane adapted to be arranged on one side of said wall with portions of its edges on the opposite side of said wall, said body wall and the window pane having coacting interlocking parts to hold the window pane and the body wall against relative movement with edges of said pane spaced inwardly from corresponding edges of the body wall while said edge portions of the body wall are inwardly turned and secured upon the edges of the window pane.

2. In a card case, a flexible body wall, a transparent window pane adapted to be arranged on one side of said wall, said wall having spaced slits therein and said transparent pane having edge portions adapted to be engaged through said slits to position said edge portions on the opposite side of said body wall whereby the window pane is held in interlocked relation to said body wall while the marginal edges of the latter are turned inwardly and secured to the edges of the window pane.

3. In a card case, a flexible body wall, two transparent window panes adapted to be arranged on opposite sides of said body wall, and means for interlocking the window panes with said body wall with the edges of both panes positioned on one side of said wall and inwardly spaced from the corresponding edges of said body wall, and the marginal portions of said body wall adapted to be turned inwardly upon and secured to the edges of the window panes.

4. In a card case, a flexible member, two transparent window panes one on each side of said flexible member having their edges arranged in superimposed relation upon one side of said flexible member and inwardly spaced from the corresponding edges of said member, and means for interlockingly connecting said window panes with the body member to hold said member and the panes against relative movement while the marginal edge portions of said body member are turned inwardly upon and secured to the edges of the window panes.

5. In a card case, a flexible body member, a sheet of transparent material folded upon itself to provide two window panes adapted to be positioned upon opposite sides of said body member with portions of their edges superimposed upon one side of said body member, and said window panes and the body member having inter-engaging parts to hold the window panes against shifting movement relative to the body member while the marginal edges of said window panes and body member are permanently secured together.

6. In a card case, a flexible body wall, a sheet of transparent material centrally folded upon itself to provide two window panes, one of said window panes and the body wall having inter-engaging means to hold the window panes against shifting movement relative to the body wall with the marginal edges of the window panes both positioned on one side of said body wall and in spaced relation to the corresponding edges of said wall, and said marginal portions of the body wall adapted to be turned inwardly upon and permanently secured to the said edges of the window panes.

7. In a card case, a flexible body wall having spaced longitudinal slits therein spaced from the opposite edges of said wall and an additional slit spaced from another edge of said wall and connected with the corresponding first named slits, a sheet of transparent material centrally folded on itself to provide two window panes one of which is adapted for insertion through the last-named slit in the body wall to position said panes upon opposite sides of said body wall, and one of said window panes adapted for insertion at its opposite edges through said first named slits in the body wall to interlockingly connect the panes with said body wall with their edge portions disposed on the same side of said wall and spaced from the corresponding edges of the latter, and said projecting edges of the body wall adapted to be turned inwardly and permanently secured to the said edge portions of the window panes.

8. A card case comprising a flexible body wall having spaced slits therein extending in parallel relation to each of two opposite edges of said wall and an additional slit connecting corresponding first named slits to provide a relatively free portion of the body wall, a sheet of transparent material centrally folded upon itself and providing two window panes, one of said panes having notches in its opposite edges and said pane adapted for insertion through the last named slit in the body wall to position the panes on opposite sides of said wall, and the edge portions of said latter window pane adapted for engagement through the first named slits whereby the edge portions of both window panes are disposed upon the same side of the body wall, and the marginal edge portions of said body wall being inwardly turned and permanently secured to the corresponding edge portions of the window panes.

In testimony that I claim the foregoing as my invention, I have signed my name hereto.

CHARLES L'ENFANT.